W. M. GOODWIN.
MEASURING INSTRUMENT.
APPLICATION FILED SEPT. 12, 1917.
1,268,002.
Patented May 28, 1918.
2 SHEETS—SHEET 1.
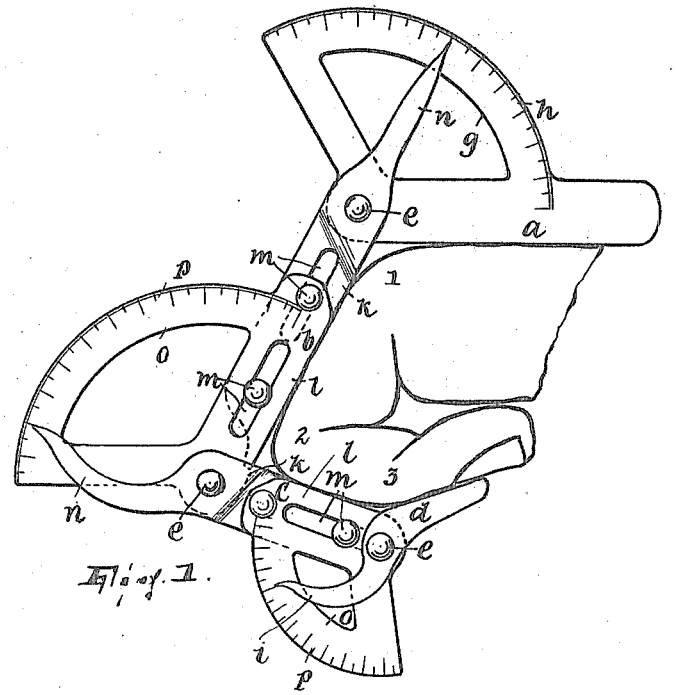
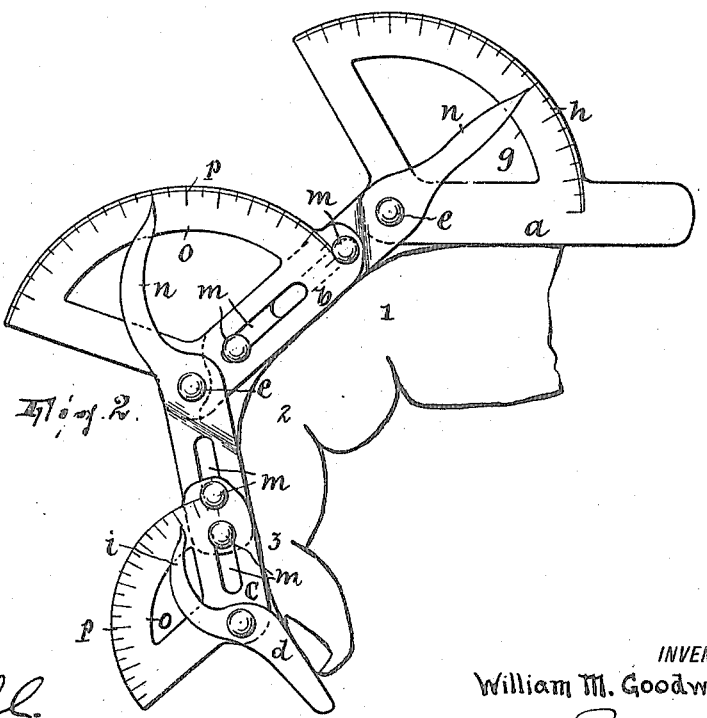
WITNESS
Wm. Bell
INVENTOR,
William M. Goodwin,
BY
John Steward.
ATTORNEY W. M. GOODWIN.
MEASURING INSTRUMENT.
APPLICATION FILED SEPT. 12, 1917.
1,268,002.
Patented May 28, 1918.
2 SHEETS—SHEET 2.
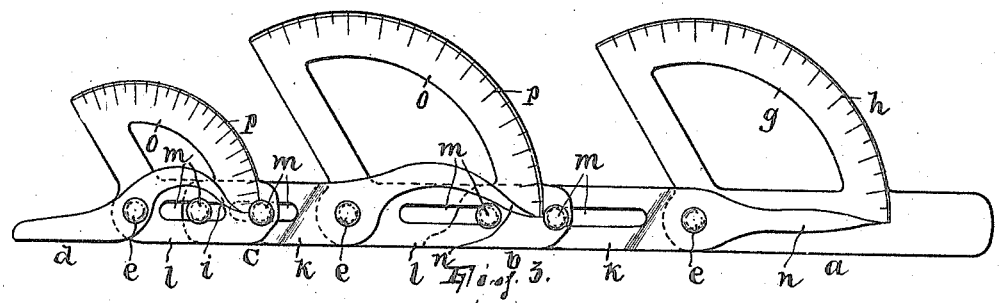
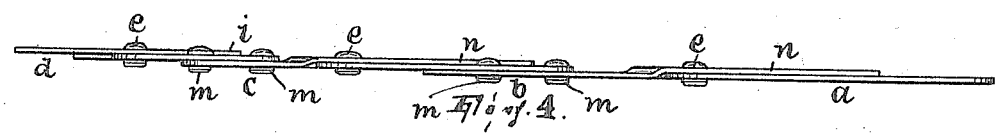
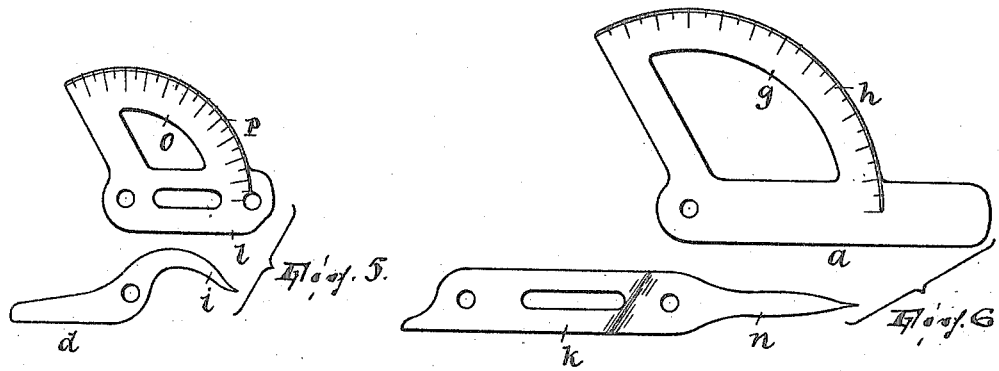
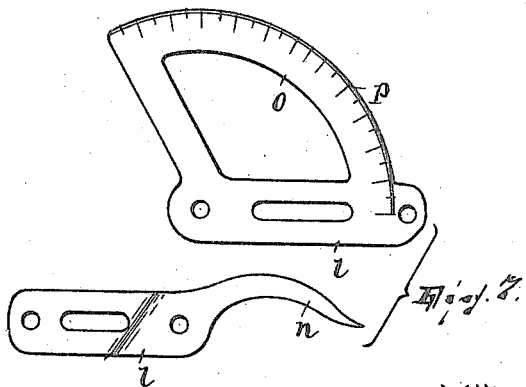
WITNESS
INVENTOR,
William M. Goodwin,
BY
ATTORNEY.

UNITED STATES PATENT OFFICE.

WILLIAM M. GOODWIN, OF NEWARK, NEW JERSEY.

MEASURING INSTRUMENT.

1,268,002.  Specification of Letters Patent.  Patented May 28, 1918.

Application filed September 12, 1917. Serial No. 190,929.

*To all whom it may concern:*

Be it known that I, WILLIAM M. GOODWIN, a citizen of the United States, residing at Newark, in the county of Essex and State of New Jersey, have invented certain new and useful Improvements in Measuring Instruments, of which the following is a specification.

The object of this invention is to provide an instrument whereby to determine the degrees of angularity of the joints of a jointed member, as in the case of a finger of the human hand, and particularly the degrees of angularity of say two neighboring joints in the same member, such instrument to be of simple construction and adjustable so as to be adapted for determining degrees of angularity in the joints of members whose parts or phalanges vary in length. Such an instrument is of peculiar value to physicians and others having occasion to determine, for example, what is the possible limit of flexion or the extent of lateral deviation in a human finger or other jointed member.

The invention consists in a measuring instrument including several phalanx members pivoted together, one of each two adjoining members including a protractor and the other a pointer movable with reference to the scale of the protractor, the same in the preferred form being adjustable in length between the pivots for the end members, say by its intermediate member including longitudinally adjustable sections, and being otherwise constructed to make it peculiarly serviceable and efficient for the particular purpose indicated.

In the accompanying drawings,

Figures 1 and 2 are side elevations illustrating the use of the instrument;

Fig. 3 is a side elevation of the instrument, straightened out;

Fig. 4 is an underneath plan; and

Figs. 5, 6 and 7 show the parts, detached from each other, going to make up the instrument.

The instrument includes in the adaptation illustrated by way of example four straight phalanx members, $a$, $b$, $c$ and $d$, pivoted together as at $e$ by means of rivets or the like.

The end phalanx member $a$ is a blade having a lateral arc-shaped extension $g$ provided with a protractor scale $h$, and the end member $d$ is a blade extended at its inner end to form the pointer $i$.

The intermediate phalanx members $b$—$c$ are substantially alike, except for size, and a description of one will serve for both: each consists of a blade formed in two sections $k$—$l$ and having longitudinal slot-and-rivet connections $m$ so that the blade is longitudinally extensible and contractible, said blade having on the right hand section ($k$) a pointer $n$ and on the left-hand section ($l$) a lateral arc-shaped extension $o$ provided with a protractor blade $p$. The pointers $n$ $n$ operate with reference to the protractors $g$, $o$, and the pointer $i$ operates with reference to the left-hand protractor $o$.

Normally, the sum total of angularities of corresponding fingers on the two hands of any human being are about equal; that is to say, if, for instance, the fully flexed index finger of one hand presented a sum total of 420° (to wit, 140°, 120° and 160° for the joints marked 1, 2 and 3 in Fig. 1), the fully flexed index finger of the other hand should present approximately the same sum total. In using the implement, therefore, to determine the degree of angularity in an ankylosed finger, for example, the operator would ascertain by its use the sum total of angularity of the corresponding normal finger, as in Fig. 1, and then ascertain by use of the instrument the sum total of angularity of the ankylosed finger, as in Fig. 2, and the difference in the two sums total would represent the extent of disability of the ankylosed finger.

In calculating the degrees of angularity of the several joints in each instance, the phalanx members $a$, $b$, $c$ and $d$ are laid edgewise against the phalanges of the finger, as shown in Figs. 1 and 2, the intermediate member being extended or contracted lengthwise to suit the length of the intermediate finger phalanges and the members being shifted on their pivots $e$ $e$. The pointers $n$ $n$ and $i$ indicate on the scales the degrees of angularity of the several joints.

The starting end of each protractor scale is in a line coincident with the corresponding pivot and parallel to the free or working edge of the member $a$ ($b$ or $c$). Further, the pointers register with the starting ends of the scales, that is, with said line, when the members are alined, as in Fig. 3. This or substantially this arrangement contemplates obtaining as considerable arc to each protractor as possible, it being obvious that if the pointers and the starting ends of the scales were appreciably remote from said line when the instrument is extended the protractors could not have sufficient arc so as to measure acute angles without producing projections on the straight edges of the members.

There is an oblique bend formed in each member $b$ and $c$ near its pivot, as shown. These bends are designed to compensate for the thickness of each member, since without them the members would not successively coincide with the center longitudinal line of the finger, but the last member $d$ would be displaced too far laterally and so prevent accuracy. Each bend further serves as a stop in swinging the protractor member in either direction on its pivot, so that the pointer is at no time unguarded (its point unprotected) by the protractor.

The end member which includes a pointer—to wit, $d$—has its free end projecting oppositely to said pointer and forming a reduced extremity on the instrument so that it may enter into recesses, as between the palm of the hand and the back of the end of a fully flexed finger capable of extreme flexion.

Having thus fully described my invention, what I claim as new and desire to secure by Letters Patent is:—

1. A measuring instrument including several substantially straight phalanx members pivoted together and forming when alined a straight edge parallel with a straight line joining the pivots, one of each two adjoining members including a protractor and the other a pointer movable with reference to the scale of the protractor, the pointers and the starting end of the scale of each protractor being in substantial coincidence with said line when the members are alined.

2. A measuring instrument including several substantially straight phalanx members pivoted together, one of each two adjoining members including a protractor and the other a pointer movable with reference to the scale of the protractor, the member in each case which has the pointer also having means to confine the pivotal movement of the other member relatively thereto within the arc represented by the protractor of the latter member.

3. A measuring instrument including several substantially straight phalanx members pivoted together, one of each two adjoining members including a protractor and the other a pointer movable with reference to the scale of the protractor, the member in each case which has the pointer also having an oblique bend confining the pivotal movement of the other member relatively thereto within the arc represented by the protractor of the latter member.

In testimony whereof I affix my signature.

WM. M. GOODWIN.

Copies of this patent may be obtained for five cents each, by addressing the "Commissioner of Patents, Washington, D. C."